US006930868B2

(12) United States Patent
Kondo et al.

(10) Patent No.: US 6,930,868 B2
(45) Date of Patent: Aug. 16, 2005

(54) APPARATUS AND METHOD OF DETECTING GROUND FAULT OF SOLAR POWER GENERATION SYSTEM

(75) Inventors: Hiroshi Kondo, Nara (JP); Naoki Manabe, Kanagawa (JP); Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 437 days.

(21) Appl. No.: 10/055,988

(22) Filed: Jan. 28, 2002

(65) Prior Publication Data

US 2002/0105765 A1 Aug. 8, 2002

(30) Foreign Application Priority Data

Feb. 2, 2001 (JP) ........................................ 2001-027341

(51) Int. Cl.[7] ................................................ H02H 3/00
(52) U.S. Cl. ........................................................ 361/42
(58) Field of Search .................... 361/42, 94; 363/55, 363/56, 131

(56) References Cited

U.S. PATENT DOCUMENTS

| 5,323,535 A | 6/1994 | Sakaki et al. ................. 29/852 |
| 5,548,504 A | 8/1996 | Takehara ..................... 363/65 |
| 5,559,657 A | 9/1996 | Lam ............................ 361/42 |
| 5,592,074 A | 1/1997 | Takehara ..................... 363/131 |
| 5,621,300 A | 4/1997 | Sato et al. ...................... 320/5 |
| 5,669,987 A | 9/1997 | Takehara et al. ............. 136/244 |
| 5,691,643 A | 11/1997 | Ishiguro et al. ............. 324/510 |
| 5,714,869 A | 2/1998 | Tamechika et al. ........... 320/30 |
| 5,751,133 A | 5/1998 | Sato et al. ..................... 320/13 |
| 5,869,956 A | 2/1999 | Nagao et al. ................. 323/299 |
| 5,892,354 A | 4/1999 | Nagao et al. ................. 323/299 |
| 5,923,158 A | 7/1999 | Kurokami et al. ........... 323/299 |
| 5,955,885 A | 9/1999 | Kurokami et al. ........... 324/426 |
| 5,986,354 A | 11/1999 | Nagao et al. ................... 307/64 |
| 6,015,081 A | 1/2000 | Okabayashi et al. ... 228/180.22 |
| 6,101,073 A | 8/2000 | Takehara ...................... 361/42 |
| 6,278,052 B1 | 8/2001 | Takehara et al. ............. 136/244 |
| 6,320,769 B2 | 11/2001 | Kurokami et al. ........ 363/56.03 |

FOREIGN PATENT DOCUMENTS

| JP | 09-285015 | 10/1997 |
| JP | 11-122819 | 4/1999 |
| KR | 1995-1816 | 1/1995 |
| KR | 1996-16043 | 5/1996 |

*Primary Examiner*—Brian Sircus
*Assistant Examiner*—Boris Benenson
(74) *Attorney, Agent, or Firm*—Fitzpatrick, Cella, Harper & Scinto

(57) ABSTRACT

In a solar power generation system which causes a non-insulated type inverter to convert DC power generated by a solar battery into AC power and outputs the AC power to a commercial power system, in detecting a ground fault, the differential current between the output lines of the solar battery is detected, an AC leakage current component due to the capacitance to ground of the solar battery is removed from the differential current, and it is determined whether a ground fault state has occurred by comparing a current value after removal of the AC leakage current component with a predetermined threshold value. With this arrangement, a false ground fault state determination that is caused by the influence of the AC leakage current component due to the electrostatic capacitance although the DC current path can be prevented, and a ground fault state can accurately be determined.

8 Claims, 9 Drawing Sheets

APPARATUS AND METHOD OF DETECTING GROUND FAULT OF SOLAR POWER GENERATION SYSTEM

FIELD OF THE INVENTION

The present invention relates to a ground fault detection apparatus and method for a solar power generation system and, more particularly, to a ground fault detection apparatus and method of detecting a ground fault state of a solar battery and stopping an inverter in a solar power generation system which converts DC power generated by the solar battery into AC power by a non-insulated type inverter and outputs the AC power to a commercial power system.

BACKGROUND OF THE INVENTION

In recent years, since problems of global warming due to carbon dioxide emission by use of fossil fuel and radioactive contamination by nuclear power plant accidents and radioactive waste have become serious, interests in global environment and energy are growing. Under these circumstances, solar power generation that uses solar light, i.e., an optical energy as an inexhaustible and clean energy source has been expected in the world.

Solar power generation apparatuses using solar batteries employ various forms corresponding to output scales from several W to several thousand kW. For general homes, solar power generation apparatuses that combine a 3- to 5-kW solar battery with a 3- to 5-kW inverter are generally used. In an apartment house or public facility where the solar battery installation area can be made larger than that for a general home, a solar power generation apparatus that combines a 10-kW solar battery with two to three 3- to 5-kW inverters connected in parallel is used.

A typical system using a solar battery converts (DC/AC-converts) DC power generated by a solar battery into AC power and supplies the AC power to a commercial power system. FIG. 8 is a circuit diagram showing the schematic arrangement of such a solar power generation apparatus.

Referring to FIG. 8, reference numeral 101 denotes a solar battery array constituted by connecting a plurality of solar battery modules in series to form solar battery strings and connecting the solar battery strings in parallel; 102, an inverter for executing DC/AC conversion; and 104, a commercial power system.

The DC output from the solar battery array 101 is collected by a current collecting box (not shown) and converted into commercial AC power by the inverter 102. A solar power generation apparatus is constructed by the solar battery array 101, current collecting box, and inverter 102. AC power generated by the solar power generation apparatus can be supplied to a load in home or to the commercial power system 104 through a distribution switchboard (not shown).

To prevent any electrical shock and to protect the current path in case of a DC ground fault in the solar battery array 101, a current transformer 105, control circuit 106, and system interconnection switch 108 are arranged in the conventional inverter 102.

A detection circuit in the current transformer 105 compares the value (ground fault detection value) of the differential current between the positive and negative poles of the solar battery array 101 with a predetermined threshold value, thereby detecting a ground fault in the solar battery array 101. If a ground fault is detected, the control circuit 106 stops an inverter circuit 107 in the inverter 102 and also turns off the system interconnection switch 108 to ensure the safety and protect the commercial power system.

In an arrangement disclosed in Japanese Patent Laid-Open No. 09-285015, an increase in capacitance between ground and a solar battery module due to water droplets sticking onto the solar battery module is taken into consideration. When a ground fault detection value representing a ground fault state is a predetermined value or more, the output power of the inverter circuit 107 is suppressed. If the ground fault detection value is still the predetermined value or more, the inverter circuit 107 is stopped, and the system interconnection switch 108 is turned off.

However, the conventional apparatus has the following disadvantages.

A voltage variation corresponding to the commercial AC frequency output from the inverter circuit 107 occurs in the DC current path of the inverter 102. This variation in voltage is transmitted to the DC current path of the solar battery array to cause a variation in AC current to ground (a variation in ground level). This variation in AC current to ground changes to an AC leakage current component by the capacitance of the solar battery array itself. The AC leakage current component increases as the current amount supplied to the inverter circuit, i.e., the power generation amount of the solar power generation apparatus increases.

In ground fault detection of the inverter, when a ground fault has occurred in the DC current path of the solar battery, the DC current path must be immediately disconnected from the commercial power system to prevent the ground fault current from continuously flowing. Hence, the sensitivity of ground fault detection of the inverter must be set high.

For this reason, in the conventional apparatus, even when the DC current path has no ground fault, an operation error may occur so that a ground fault state may be determined due to the influence of the AC leakage current component by an electrostatic capacitance and the inverter may be stopped.

Additionally, in the apparatus disclosed in Japanese Patent Laid-Open No. 09-285015, since the power generation amount is suppressed when the ground fault detection value increases due to the influence of the electrostatic capacitance, the total power generation amount of the solar power generation apparatus decreases.

SUMMARY OF THE INVENTION

The present invention has been made in consideration of the above situations, and has as its object to provide an apparatus and method of detecting a ground fault in a solar power generation system, with which a ground fault state can be accurately determined.

In order to achieve the above object, according to one aspect of the present invention, there is provided a ground fault detection apparatus for detecting a ground fault of a solar battery in a solar power generation system which causes a non-insulated type inverter to convert DC power generated by the solar battery into AC power and outputs the AC power to a commercial power system, comprising:

differential current detection means for detecting a differential current between output lines of the solar battery;

AC leakage current removing means for removing an AC leakage current component due to a capacitance to ground of the solar battery from the differential current; and determination means for determining whether a ground fault state has occurred by comparing a current value output from the AC leakage current removing means with a predetermined threshold value.

That is, in the present invention, in a solar power generation system which causes a non-insulated type inverter to convert DC power generated by a solar battery into AC power and outputs the AC power to a commercial power system, in detecting a ground fault, the differential current between the output lines of the solar battery is detected, an AC leakage current component due to the capacitance to ground of the solar battery is removed from the differential current, and it is determined whether a ground fault state has occurred by comparing a current value after removal of the AC leakage current component with a predetermined threshold value.

With this arrangement, any ground fault state determination that is caused by the influence of the AC leakage current component due to the electrostatic capacitance although the DC current path is not in the ground fault state can be prevented, and a ground fault state can accurately be determined.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Embodiments of a ground fault detection apparatus in a solar power generation system according to the present invention will be described below in detail with reference to the accompanying drawings.

[First Embodiment]

Figure 1:
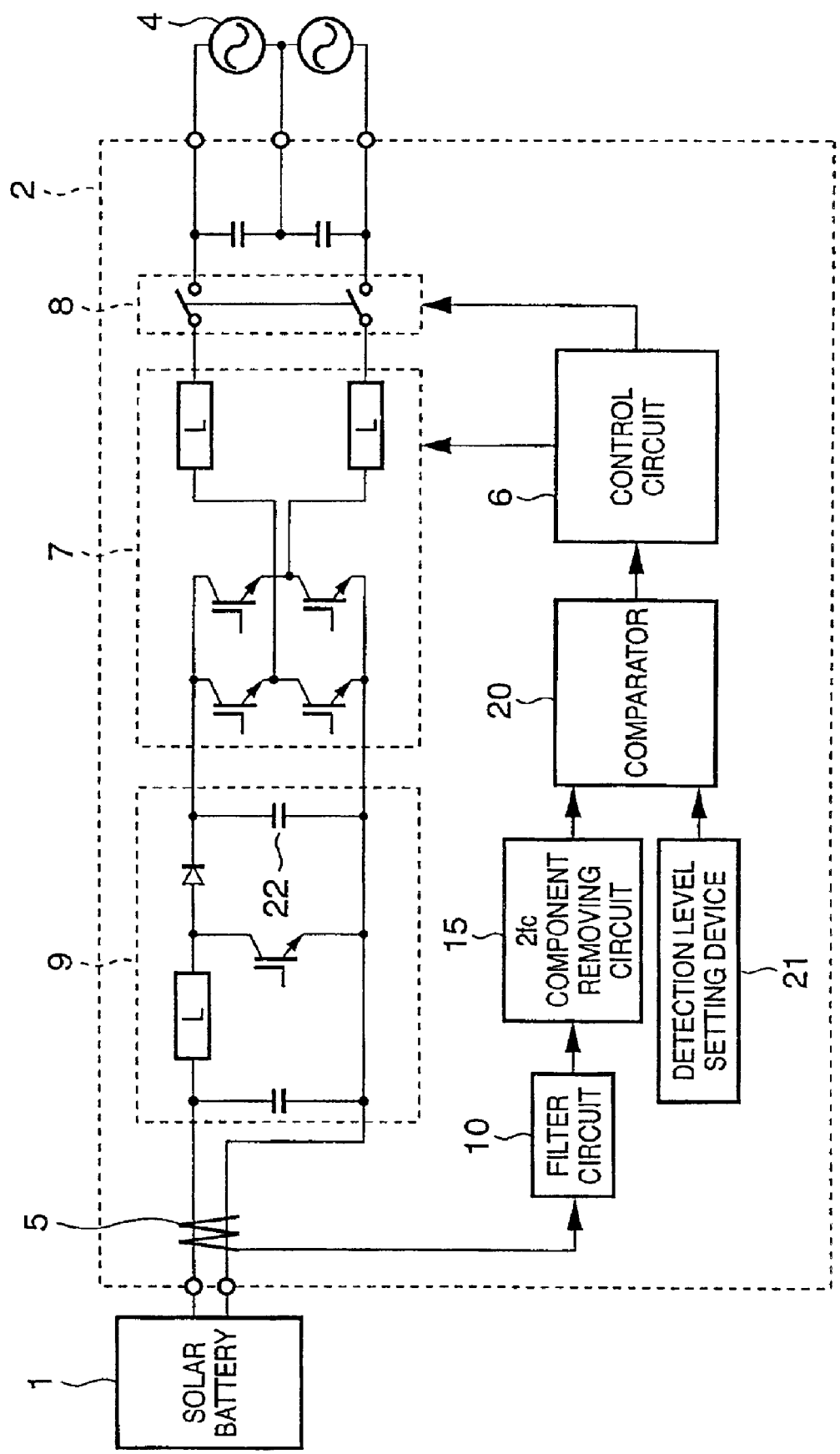
FIG. 1 is a block diagram showing the arrangement of a solar power generation system including the first embodiment of a ground fault detection apparatus according to the present invention.

FIG. 1 is a block diagram showing the schematic arrangement of a solar power generation system which employs the first embodiment of a ground fault detection apparatus according to the present invention. Main components will be briefly described.

Referring to FIG. 1, reference numeral 1 denotes a solar battery array which is constituted by connecting a plurality of solar battery modules in series to form solar battery strings and connecting the solar battery strings in parallel. The solar battery module can use either an amorphous-silicon-based material, polysilicon, or crystallized silicon for the photoelectric conversion section. An appropriate solar battery module is used in accordance with the application purpose or installation site.

Reference numeral 2 denotes an inverter. The output from the solar battery array 1 is collected by a current collecting box (not shown) and then guided to the inverter 2. In the inverter 2, DC power output from the solar battery array is converted into AC power, or the voltage/current operating point of the solar battery is kept at the maximum power by adjusting the DC voltage or DC current.

The output line from the inverter 2 comprises two voltage lines and one neutral line so that a 200-V single-phase three-wire system is formed with an AC voltage of 200 V between the two voltage lines.

The single-phase three-wire output of 200 V from the inverter 2 is output to a commercial power system 4. That is, AC power generated by the solar power generation system is connected to the commercial power system 4. The inverter 2 and commercial power system 4 are connected through a distribution switchboard (not shown). In addition to the inverter 2 and commercial power system 4, a load (not shown) in home is also connected to the distribution switchboard.

When the power generation amount of the solar power generation system exceeds the use amount of the load, the power is sold to the commercial power system. To the contrary, when the power generation amount of the solar power generation apparatus is smaller than the use amount of the load, power is bought from the commercial power system.

Main components of the inverter 2 will be described next. To convert DC power output from the solar battery array 1 into single-phase AC power of 200 V, a booster circuit 9 boosts a received DC output voltage to 320 V. For this value, an increase in system voltage is added to the peak value of the AC output voltage.

The solar battery array 1 used in the present invention has an array structure with an optimum operation voltage of 200 V. Since maximum power operating point tracing control is executed within the range of 150 to 300 V, the booster circuit 9 outputs a voltage of 320 V with respect to an input voltage of 150 to 300 V.

The booster circuit 9 of this embodiment is formed from a boost chopper circuit, as shown in FIG. 1, and the switching frequency is 20 kHz.

Figure 2:
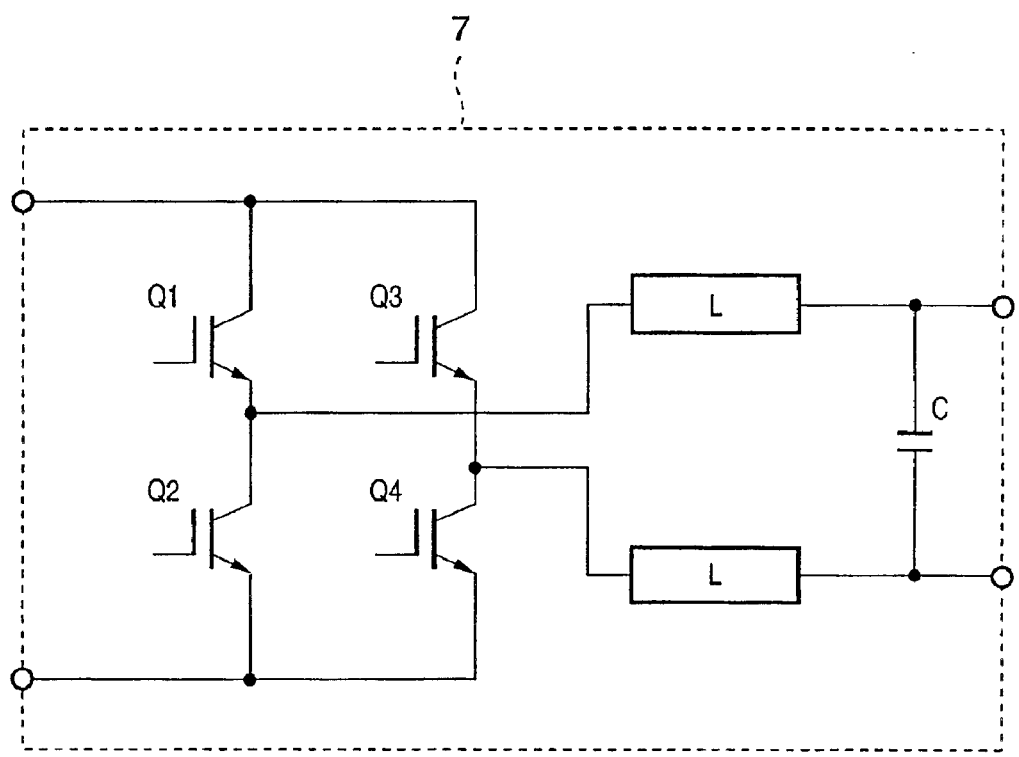
FIG. 2 is a circuit diagram showing details of an inverter circuit 7 shown in FIG. 1.

An inverter circuit 7 converts the power boosted to a DC voltage of 320 V by the booster circuit 9 into commercial AC power. FIG. 2 is a circuit diagram showing details of the inverter circuit 7.

In the inverter circuit 7 of this embodiment, an IGBT is used as the switching element of the main circuit. The operation frequency is set to 20 kHz more than the audio frequency. The inverter circuit 7 is formed from four IGBT elements Q1 to Q4 and filters L and C. The inverter circuit 7 repeatedly turns on/off the IGBT elements by sine wave modulation PWM control, thereby converting DC power into AC power.

A system interconnection switch 8 is formed from an electromagnetic relay that can be turned on/off by an external signal in this embodiment.

The system interconnection switch 8 is turned on in the operative state of the inverter and turned off in the stop state of the inverter. When an error in the inverter 2 or commercial power system 4 is detected during the operation of the solar power generation system, the system interconnection switch 8 is disconnected by a disconnection instruction from a control circuit 6.

A current transformer 5 is arranged in the inverter 2 to prevent any electrical shock and to protect the current path when a ground fault has occurred in the solar power generation system. The current transformer 5 outputs the differential current between the positive and negative poles of the solar battery array 1, which is necessary to detect a ground fault state of the solar battery array 1.

In this embodiment, the current transformer 5 is arranged in the DC current path at the input of the inverter 2. However, the current transformer 5 may be arranged in the AC current path at the output of the inverter 2 or may be inserted between the booster circuit 9 and the inverter circuit 7 while putting the two lines together. This is because in the transformerless scheme of this embodiment, a ground fault current in the DC circuit becomes not only an unbalanced current in the DC circuit but also an unbalanced current in the AC circuit.

In this embodiment, the current transformer 5 is arranged in the inverter 2. However, the current transformer 5 may be arranged outside the inverter 2.

A filter circuit 10 removes a predetermined frequency component from the differential current output from the current transformer 5. Since the inverter circuit used in this embodiment executes switching at a frequency of 20 kHz, the filter circuit 10 removes a component of 20 kHz.

A 2fc component removing circuit 15 removes a frequency 2fc that is twice the system AC frequency. In this embodiment, data corresponding to a half cycle (½fc (Hz)) of the system AC frequency is averaged and output.

To remove the frequency component 2fc twice the system AC frequency, the frequency 2fc is removed using a band filter, or data is sampled at the zero-cross points of the system frequency in synchronism with the system frequency. Either method can be applied to this embodiment.

A detection level setting device 21 outputs the threshold value of a preset ground fault detection value. This value is set in installing the inverter 2. Operation performed when the ground fault detection level is set to 50 mA will be described below.

A comparator 20 compares the value output from the detection level setting device 21 with a value obtained by passing the output from the current transformer 5 through the filter circuit 10 and 2fc component removing circuit 15. If the output value (DC output value) from the 2fc component removing circuit 15 exceeds the value output from the detection level setting device 21, the comparator 20 outputs a ground fault detection signal.

The control circuit 6 controls the inverter circuit 7 and system interconnection switch 8. Upon receiving a ground fault detection signal from the comparator 20, the control circuit outputs a stop instruction and disconnection instruction to the inverter circuit 7 and system interconnection switch 8, respectively.

The operation of the ground fault detection apparatus according to this embodiment with the above arrangement will be described next.

As described above, in the inverter 2 of this embodiment, the current transformer 5 obtains a differential current Ic between the current supplied from the positive pole side of the solar battery array 1 and the current supplied from its negative pole side. A ground fault state of the DC current path is detected from the level of the differential current Ic. More specifically, the ground fault detection apparatus is constituted by the current transformer 5, the filter circuit 10 that removes a PWM component, the 2fc component removing circuit 15 that removes the influence of the frequency 2fc twice the system frequency, the comparator 20, and the detection level setting device 21.

Figure 3A:
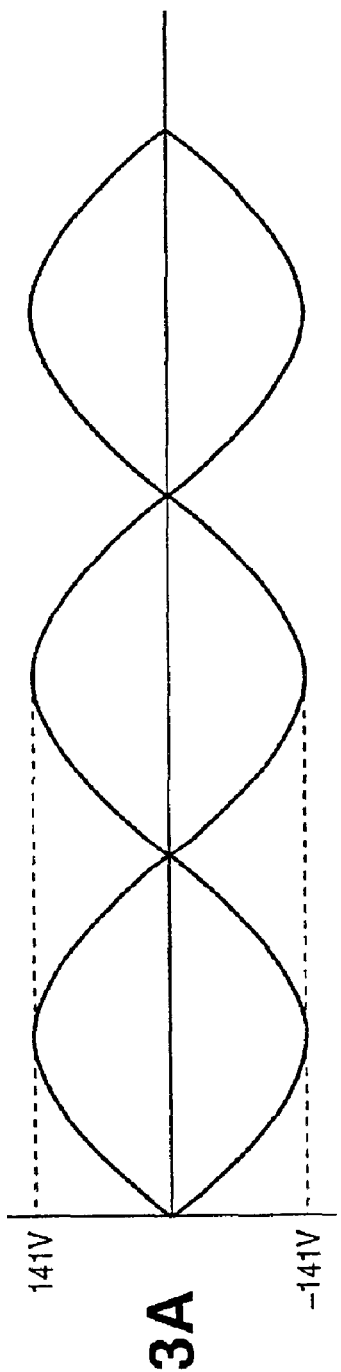
FIGS. 3A to 3D are graphs showing signal waveforms related to ground fault detection in the ground fault detection apparatus shown in FIG. 1.
Figure 3B:
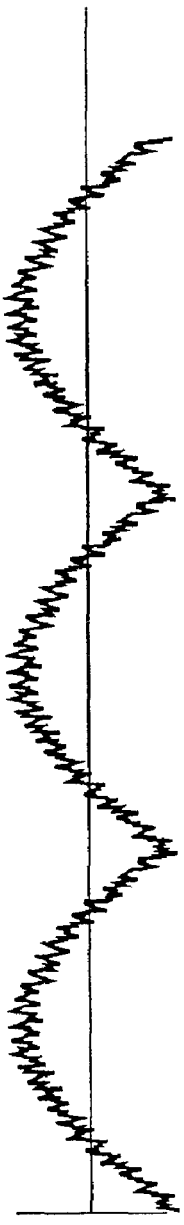
Figure 3C:
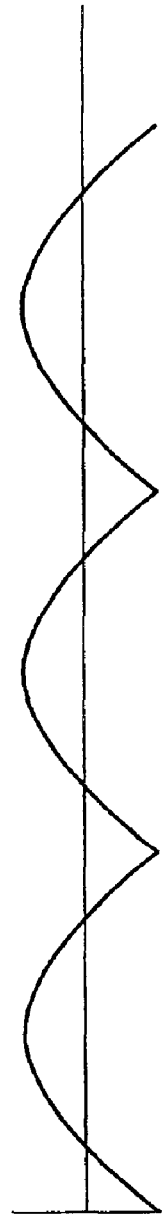
Figure 3D:
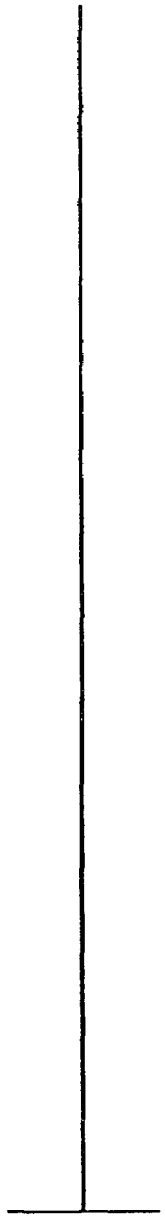

FIGS. 3A to 3D are graphs showing signal waveforms related to ground fault detection. FIG. 3A shows the waveform of the system AC voltage output when the inverter 2 is steadily operating. FIG. 3B shows the detection waveform of the current transformer 5 at that time. FIG. 3C shows a waveform obtained by removing a PWM component, i.e., a switching frequency of 20 kHz in this embodiment, from the detection waveform of the current transformer 5. FIG. 3D shows a result obtained by removing the frequency component 2fc twice the system AC frequency, i.e., a waveform obtained by averaging time data corresponding to the half cycle of the system AC frequency. At this time, assume that the solar battery array 1 has no ground fault, and the solar power generation system is continuing operation with a predetermined power generation amount.

When the inverter circuit 7 executes switching to generate the waveform of a single-phase three-wire output of 200 V as shown in FIG. 3A, an AC component having a frequency twice the commercial AC frequency is superposed on the DC current path of the solar battery array 1. An AC leakage current is generated by the interaction between that component and the electrostatic capacitance between the solar battery array 1 and ground (GND). At this time, the AC component of the DC current path is suppressed by the capacitor 22 shown in FIG. 1. To sufficiently suppress the AC variation, the capacitance of the capacitor must be increased. Since a capacitor having a high breakdown voltage must be used as the capacitor 22, an increase in capacitance increases the cost and space. In the inverter of this embodiment, a capacitor with a capacitance of several thousand µF is used as the capacitor 22. Even with a capacitor with such a capacitance, an AC variation occurs in the DC current path, and an AC leakage current is generated by the electrostatic capacitance of the solar battery array 1.

A ground fault detection waveform as shown in FIG. 3B is detected by the current transformer 5 due to the influence of the AC leakage current. The ground fault detection waveform shown in FIG. 3B contains a PWM component by the switching frequency of 20 kHz. A waveform as shown in FIG. 3C is obtained by removing the PWM component by the filter circuit 10. However, the waveform shown in FIG. 3C contains the frequency component 2fc twice the system AC frequency. When the frequency component 2fc is removed by the 2fc component removing circuit 15, a waveform shown in FIG. 3D is obtained.

As described above, in this embodiment, a ground fault state is detected using a signal waveform obtained by removing not only the PWM component but also the frequency component twice the system AC frequency. For this reason, any operation error that stops the inverter upon erroneously determining a ground fault due to the influence of the AC leakage current component by the electrostatic capacitance can be prevented.

Assuming that a ground fault has actually occurred, ground fault detection in which only the switching frequency of 20 kHz is removed and ground fault detection in which the frequency 2fc twice the system AC frequency is also removed in addition to the switching frequency of 20 kHz will be compared. Assume that 50 mA is set in the detection level setting device 21 as a detection level.

Figure 4A:
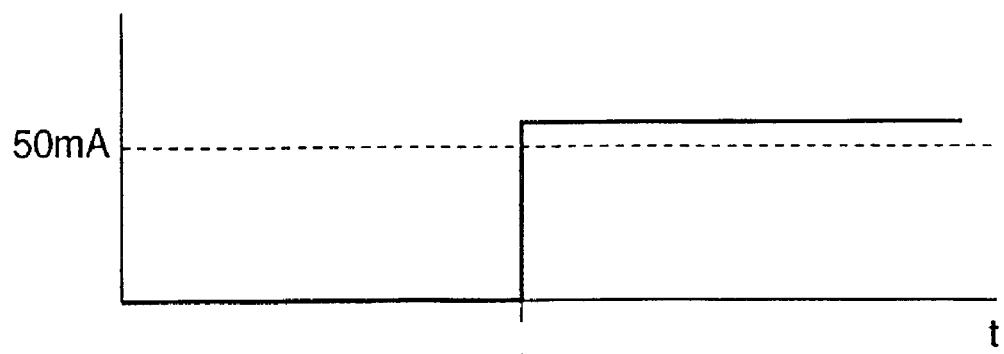
FIGS. 4A to 4F are graphs showing signal waveforms at various portions in FIG. 1.
Figure 4B:
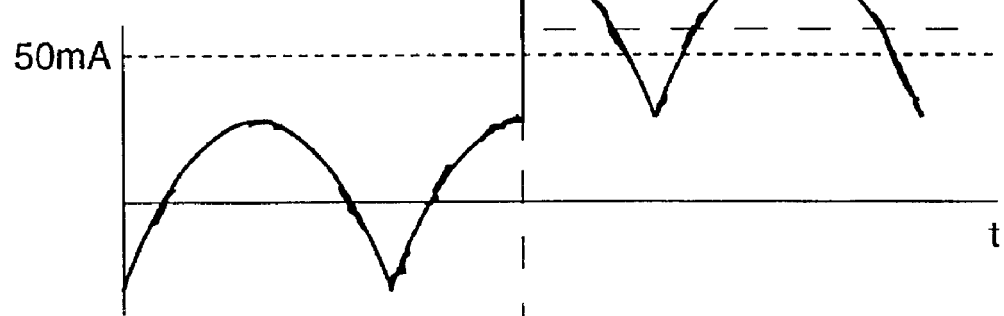
Figure 4C:
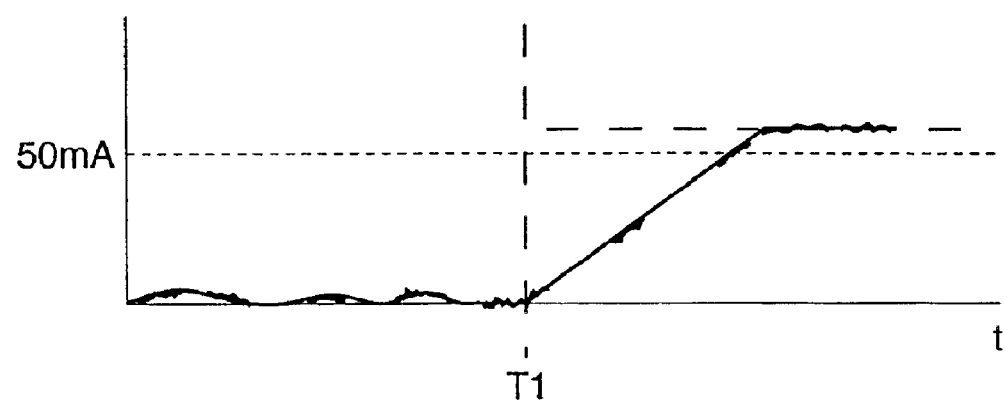
Figure 4D:
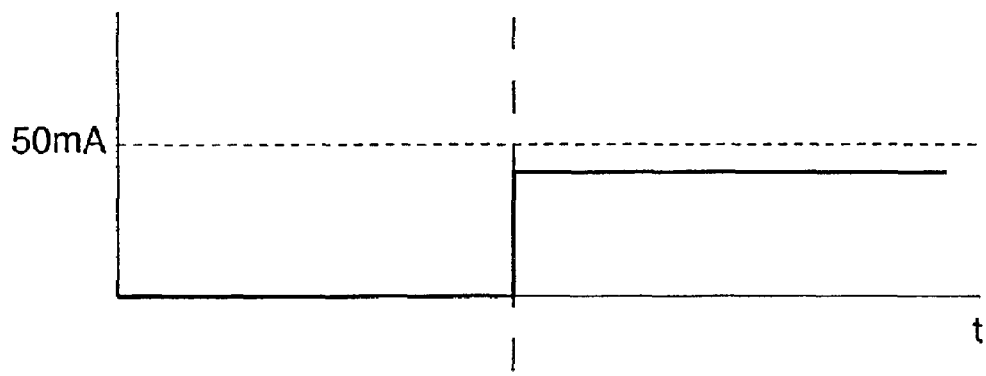
Figure 4E:
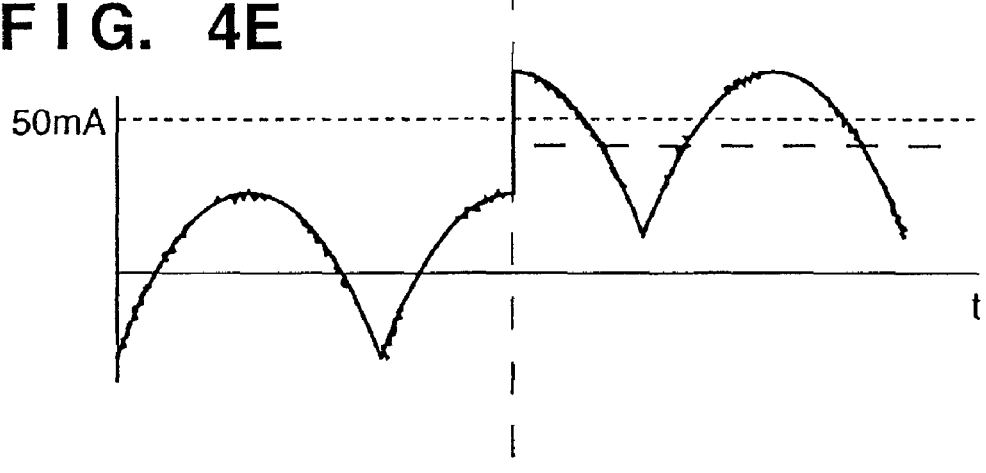
Figure 4F:
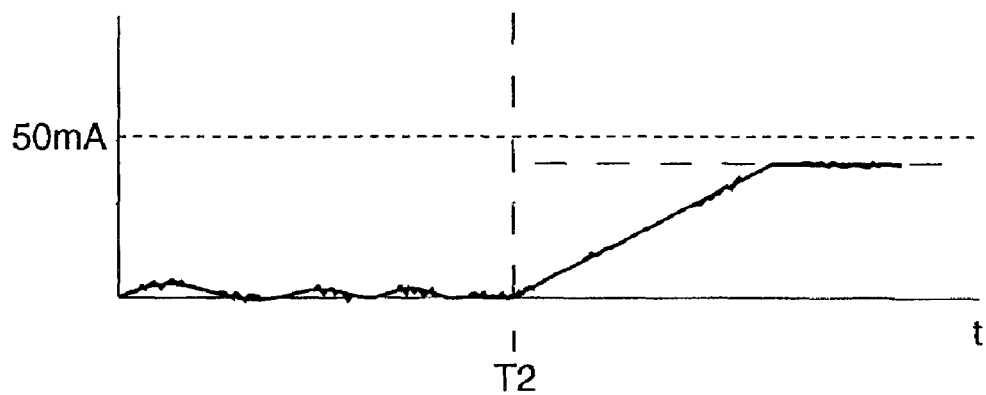

FIGS. 4A to 4F are graphs that plot time along the abscissa and the level along the ordinate. FIGS. 4A and 4D show the signal levels of a ground fault component Idc. FIGS. 4B and 4E show signal levels obtained when only the switching frequency of 20 kHz is removed. FIGS. 4C and 4F show signal levels obtained when averaging is executed to remove the frequency 2fc twice the system AC frequency as well as the switching frequency of 20 kHz from the detection signal of the current transformer 5. FIGS. 4A to 4C show a case wherein a ground fault of 60 mA has occurred at time T1. FIGS. 4D to 4F show a case wherein a ground fault of 40 mA has occurred at time T2.

The actual ground fault component Idc in the solar battery array 1 has the levels shown in FIGS. 4A and 4D. However, the signal level output from the current transformer 5 is equivalent to the sum of the ground fault component Idc and AC leakage current component Iac. When only the switching frequency of 20 kHz is removed from the signal of the current transformer 5 by the filter circuit 10, signal levels as shown in FIGS. 4B and 4E are obtained. Even in this state, since the influence of the AC leakage current component Iac is large, it is difficult to determine whether the ground fault component Idc exceeds the threshold value "50 mA". For this reason, the above-described detection error occurs at high probability.

In addition, the value of the AC leakage current component Iac changes depending on the magnitude of the switching current, i.e., the power generation amount. For this reason, if the influence of the AC leakage current component Iac is large, no DC ground fault can accurately be detected.

On the other hand, in the arrangement of this embodiment, since the frequency component 2fc twice the system AC frequency is removed from the detection signal of the current transformer 5 by the 2fc component removing circuit 15 in addition to the PWM component of the switching frequency of 20 kHz, it is determined from the signal levels shown in FIGS. 4C and 4F whether the ground fault component Idc exceeds the threshold value "50 mA" In this case, the influence of the AC leakage current component Iac becomes small, as shown in FIGS. 4C and 4F. Hence, in the case shown in FIG. 4C, it can accurately be determined that Idc exceeds 50 mA. In the case shown in FIG. 4F, it can accurately be determined that Idc does not exceed 50 mA.

As described above, according to this embodiment, since the influence of the AC leakage current component can be reduced by removing the frequency component 2fc twice the system AC frequency from the detection signal of the current transformer 5, a DC ground fault can more accurately be detected.

[Second Embodiment]

The second embodiment of a ground fault detection apparatus according to the present invention will be described below. In the first embodiment, to reduce the influence of the AC leakage current component due to the electrostatic capacitance, averaging processing of removing the frequency component 2fc twice the system AC frequency from the ground fault detection value is executed. In this embodiment, a variation in voltage to ground in a DC current path is detected. In addition, the capacitance to ground value of a solar battery is input in advance. A predetermined arithmetic operation is executed using the voltage-to-ground variation value and electrostatic capacitance value as parameters to calculate an AC leakage current component due to the capacitance to ground. With this processing, the influence of the AC leakage current due to the capacitance to ground of the solar battery array is reduced from the ground fault detection value, thereby accurately detecting a DC ground fault.

Figure 5:
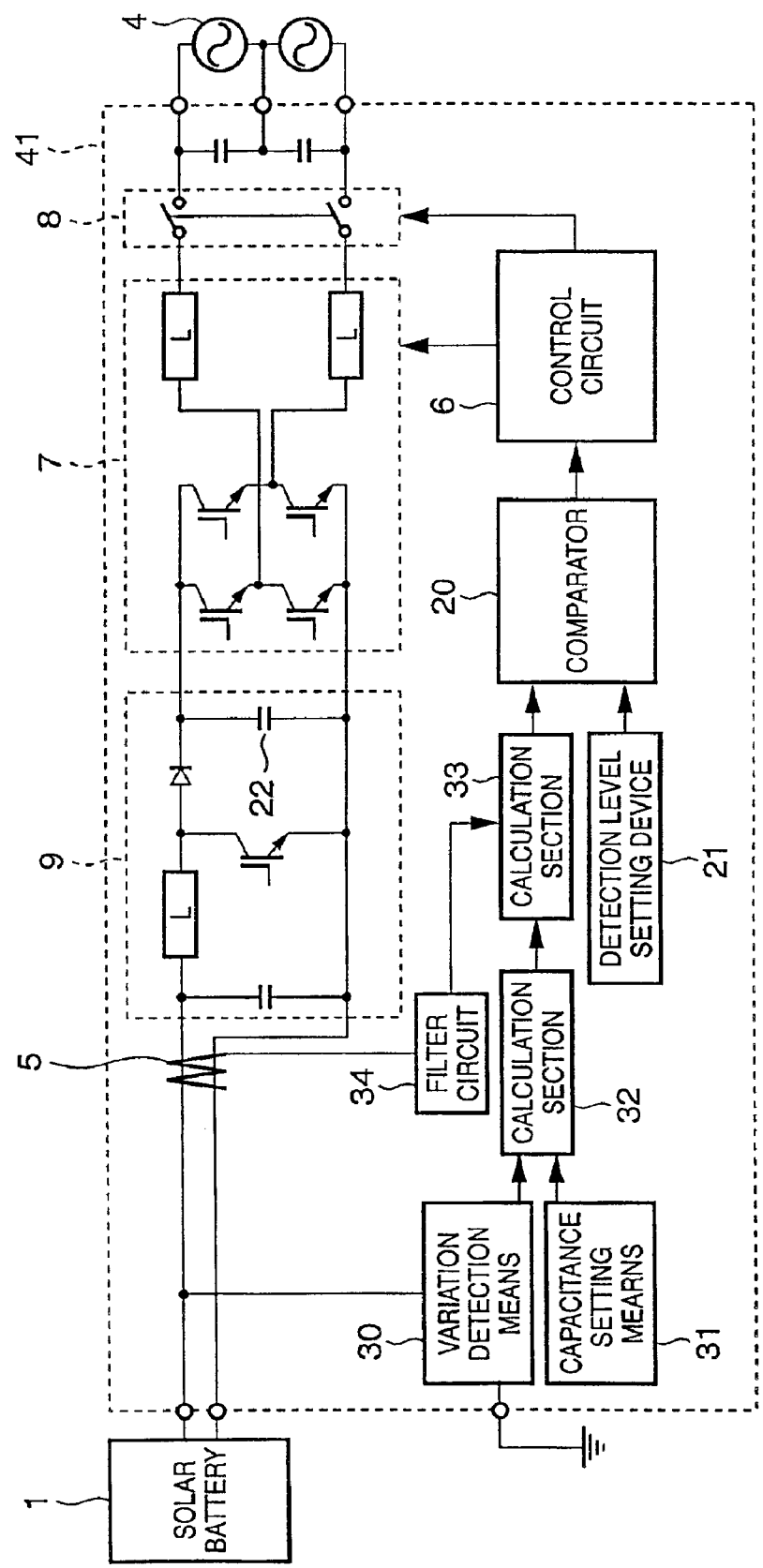
FIG. 5 is a block diagram showing the arrangement of a solar power generation system including the second embodiment of a ground fault detection apparatus according to the present invention.

FIG. 5 is a block diagram showing the schematic arrangement of a solar power generation system that employs the ground fault detection apparatus of this embodiment. Like the arrangement described with reference to FIG. 1, the solar power generation system comprises a solar battery array 1 and inverter 41. The output from the inverter 41 is output to a commercial AC power system 4. The ground fault detection apparatus is arranged in the inverter 41. The same reference numerals as in the first embodiment denote the same components in FIG. 5, and a description thereof will be omitted. Parts different from the first embodiment will be described.

A voltage-to-ground variation detection means 30 detects a variation in difference voltage between the ground potential and the potential to ground in the DC current path that connects the solar battery array 1 and booster circuit 9.

A capacitance to ground setting means 31 inputs the electrostatic capacitance of the solar battery array 1 in advance. Since the capacitance to ground value of the solar battery array is determined by the type and capacity of the solar battery array, the type and power generation capacity of the solar battery array may be input. When the type of a solar battery to be used has been determined in advance, only the power generation capacity is input. If the power generation capacity has also been determined, a fixed value is used.

A calculation section 32 calculates an AC leakage current prediction value from the electrostatic capacitance of the solar battery array 1 on the basis of the detection value of the voltage-to-ground variation detection means 30 and the set value of the capacitance to ground setting means 31.

That is, letting E be a value detected by the voltage-to-ground variation detection means 30, f be the frequency, and C be the electrostatic capacitance value set in the capacitance to ground setting means 31, an AC leakage current i is given by $$i = 2\pi f C E$$

A calculation section 33 receives a ground fault detection value detected by a current transformer 5 and the AC leakage current prediction value by the calculation section 32 and outputs a signal obtained by subtracting the AC leakage current prediction value from the ground fault detection value to a comparator 20. When the output value from the calculation section 33 exceeds a value set by a detection level setting device 21, the comparator 20 outputs a ground fault detection signal. A filter circuit 34 removes a PWM component.

In the inverter 41 of this embodiment, the ground fault detection apparatus is constituted by the current transformer 5, filter circuit 34, voltage-to-ground variation detection means 30, capacitance to ground setting means 31, calculation sections 32 and 33, comparator 20, and detection level setting device 21.

The operation of the ground fault detection apparatus of this embodiment will be briefly described. A variation in voltage to ground in the DC current path of the solar battery array 1 is detected. On the basis of the detected value and the set value of the capacitance to ground, an AC leakage current prediction value from the electrostatic capacitance is calculated in accordance with a predetermined equation. A value obtained by subtracting the prediction value from the detection value of the current transformer 5 is compared with the detection threshold value, thereby determining a ground fault state.

As described above, according to this embodiment, a ground fault state is determined on the basis of a value obtained by subtracting an AC leakage current prediction value calculated from a variation in voltage to ground and an electrostatic capacitance value from the output of the current transformer. With this processing, the influence of the AC leakage current component is reduced, thereby more accurately detecting a DC ground fault.

[Third Embodiment]

The third embodiment of a ground fault detection apparatus according to the present invention will be described below. In this embodiment, a variation in voltage of the booster section of an inverter is detected. In addition, the capacitance to ground value of a solar battery is input in advance. A predetermined arithmetic operation is executed using the voltage-to-ground variation value and electrostatic capacitance value as parameters to calculate the prediction value of an AC leakage current due. With this processing, the influence of the AC leakage current is removed from the ground fault detection value, thereby accurately detecting a DC ground fault.

Figure 6:
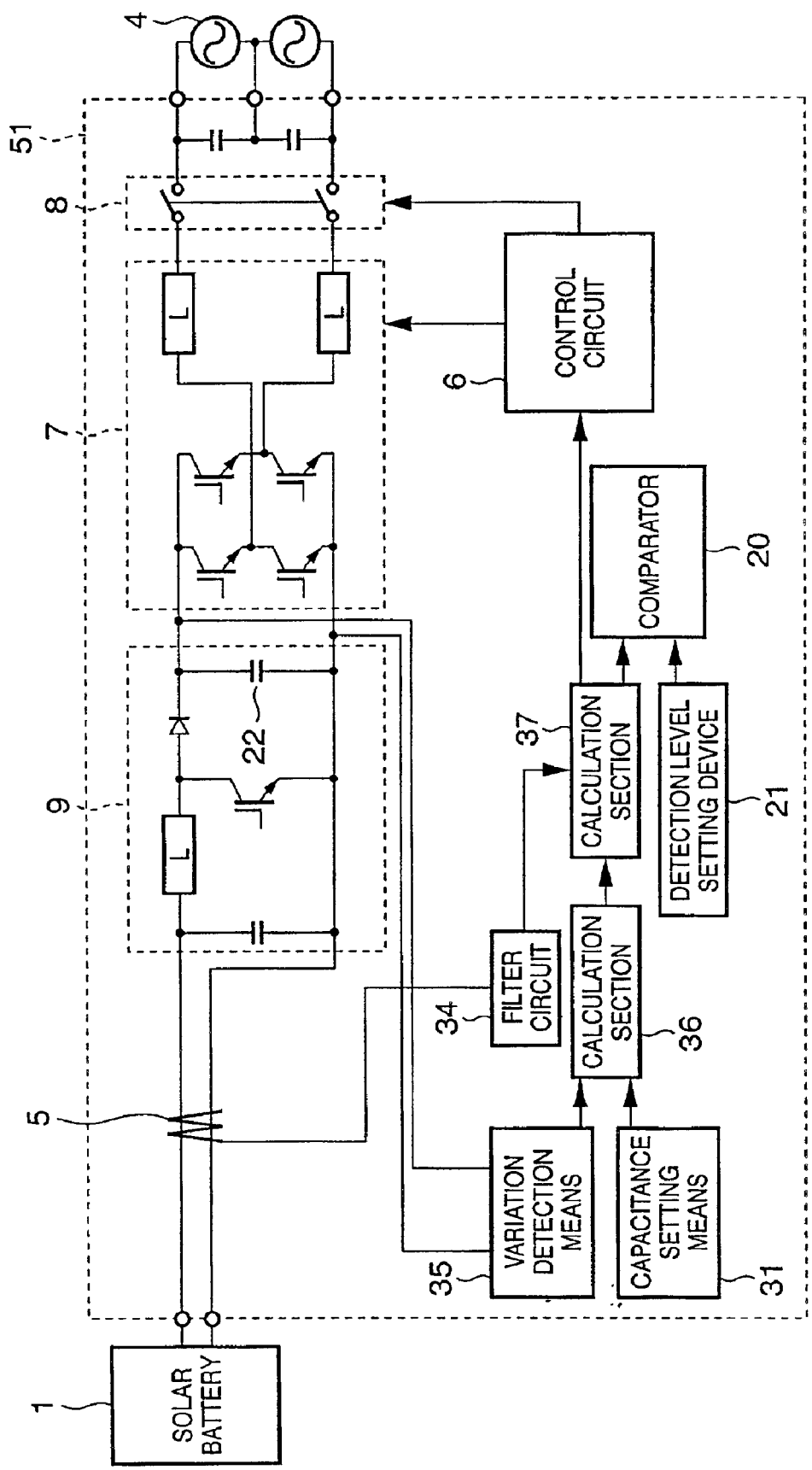
FIG. 6 is a block diagram showing the arrangement of a solar power generation system including the third embodiment of a ground fault detection apparatus according to the present invention.

FIG. 6 is a block diagram showing the arrangement of a solar power generation system including the ground fault detection apparatus of this embodiment. Like the arrangement described with reference to FIG. 1, the solar power generation system comprises a solar battery array 1 and inverter 51. The output from the inverter 51 is output to a commercial AC power system 4. The ground fault detection apparatus is arranged in the inverter 51. The same reference numerals as in the first and second embodiments denote the same components in FIG. 6, and a description thereof will be omitted. Parts different from the first and second embodiments will be described.

A booster section voltage variation detection means 35 detects a state wherein the voltage section boosted by a booster circuit 9 varies due to an inverter circuit 7.

A calculation section 36 calculates an AC leakage current prediction value from the electrostatic capacitance of the solar battery array 1 on the basis of the detection value of the booster section voltage variation detection means 35 and the set value of a capacitance to ground setting means 31.

That is, letting E be a value detected by the voltage-to-ground variation detection means 30, f be the frequency, and C be the electrostatic capacitance value set in the capacitance to ground setting means 31, an AC leakage current i is given by $$i = 2\pi f C E$$

A calculation section 37 receives a ground fault detection value detected by a current transformer 5 and the AC leakage current prediction value by the calculation section 36 and outputs a signal obtained by subtracting the AC leakage current prediction value from the ground fault detection value to a comparator 20. When the output value from the calculation section 33 exceeds a value set by a detection level setting device 21, the comparator 20 outputs a ground fault detection signal.

In the inverter 51 of this embodiment, the ground fault detection apparatus is constituted by the current transformer 5, the filter circuit 34 that removes the PWM component, the booster section voltage variation detection means 35, the calculation sections 36 and 37, the comparator 20, and the detection level setting device 21.

The operation of the ground fault detection apparatus of this embodiment will be briefly described.

This embodiment exploits the fact that as the variation in voltage of the booster section generated by switching of the inverter circuit 7 increases, the AC leakage current due to the electrostatic capacitance of the solar battery array 1 increases.

That is, the AC leakage current prediction value due to the electrostatic capacitance is calculated by the calculation section 36 on the basis of the output from the booster section voltage variation detection means 35 and the value stored in the capacitance to ground setting means 31. Then, the calculated prediction value is subtracted from the detection value of the current transformer 5 by the calculation section 37 to reduce the influence of an AC leakage current component Iac, thereby more accurately detecting a DC ground fault.

The voltage variation in the booster circuit 9 is determined by the switching current of the inverter circuit, i.e., the power generation amount of the inverter and the capacitance of a capacitor 22. Hence, the AC leakage current due to the capacitance to ground of the solar battery array is determined by the power generation amount of the inverter and the capacitance to ground of the solar battery.

In a control circuit 6, the leakage current prediction value from the electrostatic capacitance may be calculated on the basis of the power generation amount of the inverter and the input value from the electrostatic capacitance setting means.

As described above, according to this embodiment, a value calculated from the detection value of a variation in inverter booster section voltage and the capacitance to ground value of the solar battery array is removed from the detection signal of the ground fault detection means to reduce the influence of the AC leakage current component, thereby more accurately detecting a DC ground fault.

[Other Embodiment]

Figure 7:
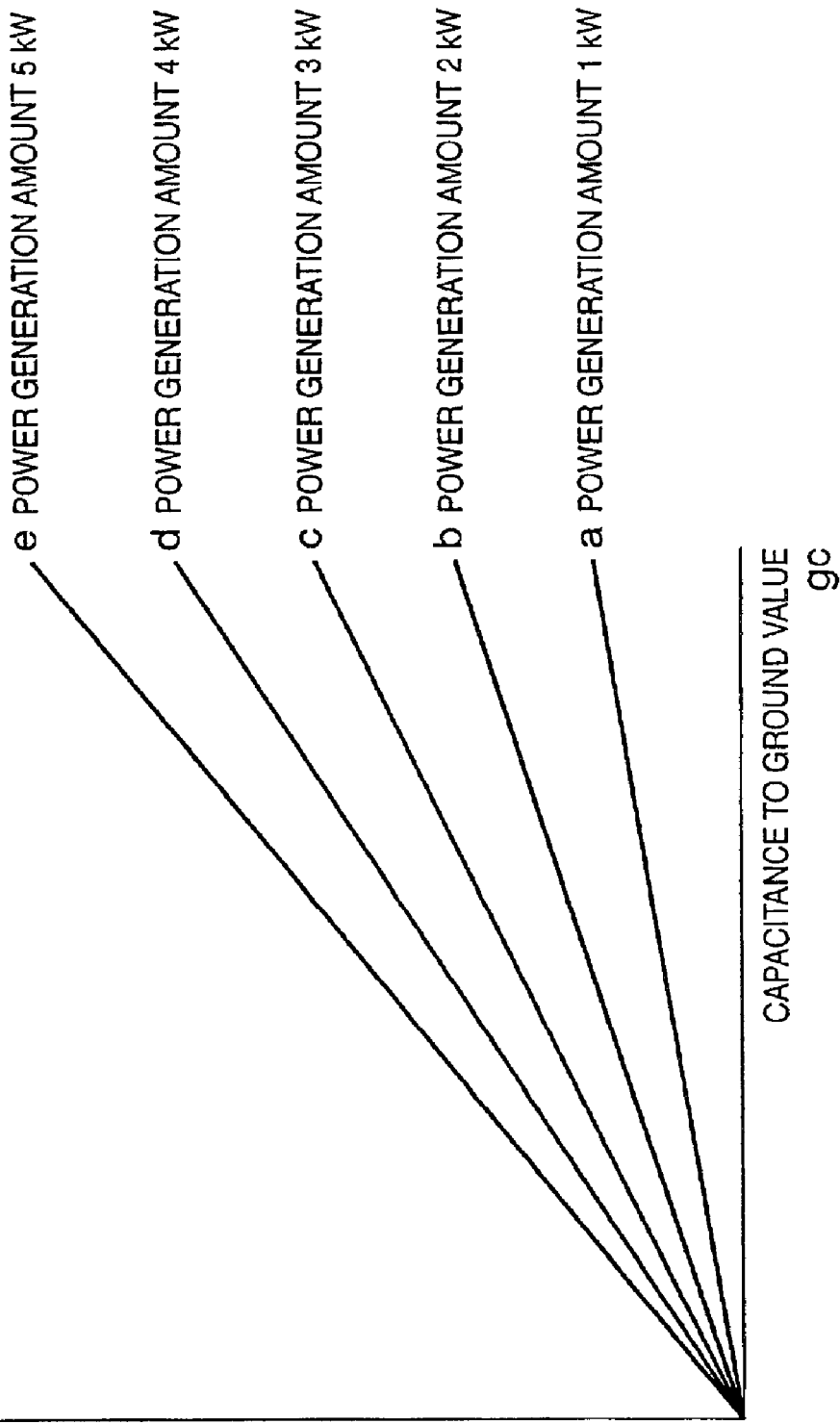
FIG. 7 is a graph showing the relationship between the power generation amount of the solar power generation system and the leakage current prediction value by a capacitance to ground value.
Figure 8:
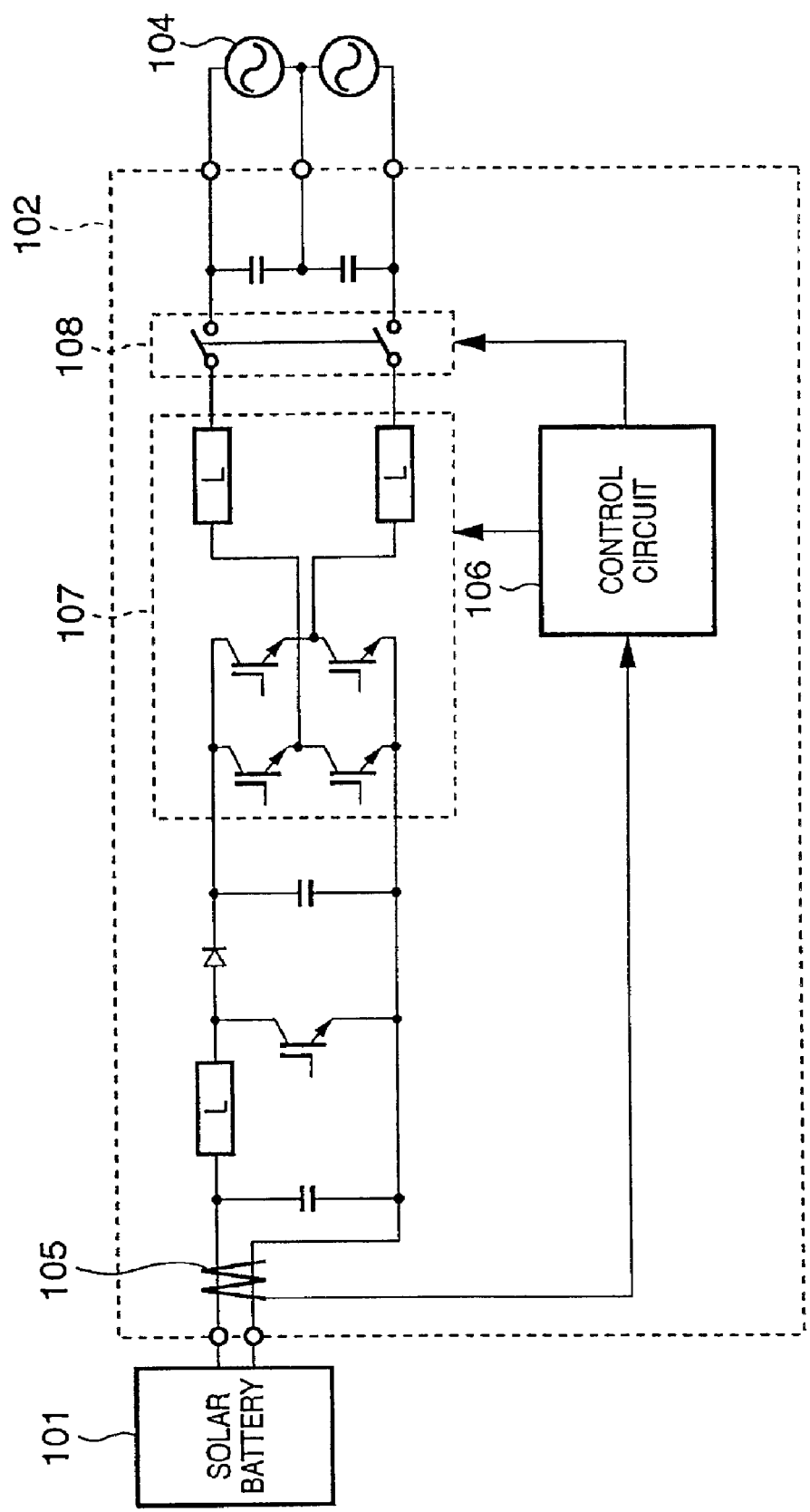
FIG. 8 is a block diagram showing the arrangement of a solar power generation system including a conventional ground fault detection apparatus.
Figure 5:
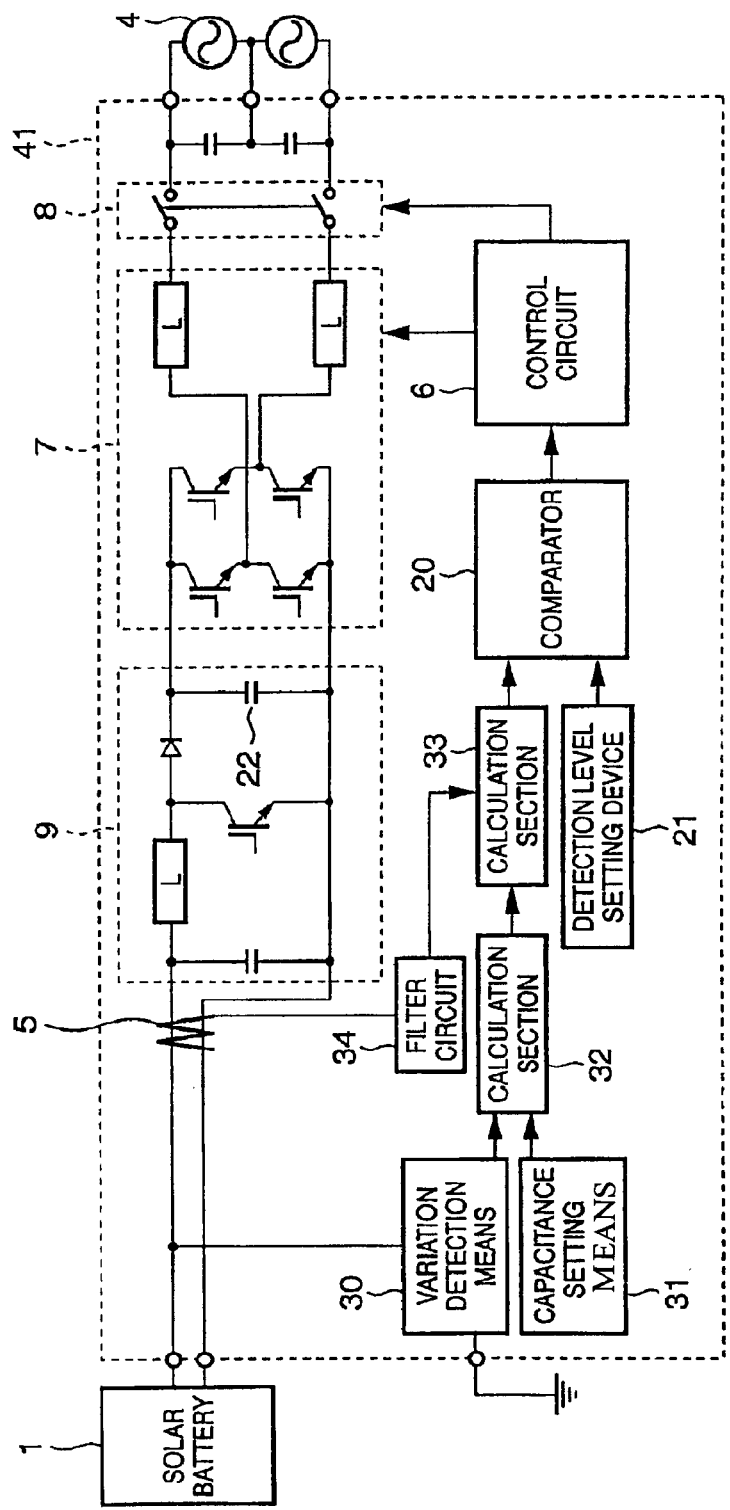

FIG. 7 is a graph showing a change in leakage current prediction value due to an electrostatic capacitance, which is obtained from the power generation amount of an inverter and an electrostatic capacitance. As shown in FIG. 7, the leakage current is proportional to the power generation amount and capacitance to ground.

Even when the influence of an AC leakage current component Iac is reduced by subtracting a leakage current prediction value obtained from the graph shown in FIG. 7 from the detection value of a ground fault detection means, a DC ground fault can accurately be detected.

The present invention can be applied to a system constituted by a plurality of devices or to an apparatus comprising a single device.

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program.

In this case, the program code read from the storage medium realize the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, additional functions according to the above embodiments are realized by executing the program code which are read by a computer. The present invention includes a case where an OS (operating system) or the like working on the computer performs a part or entire process in accordance with designations of the program code and realizes functions according to the above embodiments.

Furthermore, the present invention also includes a case where, after the program code read from the storage medium are written in a function expansion card which is inserted into the computer or in a memory provided in a function expansion unit which is connected to the computer, a CPU or the like contained in the function expansion card or function expansion unit performs a part or entire process in accordance with designations of the program code and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A ground fault detection apparatus for detecting a ground fault of a solar battery in a solar power generation system which causes a non-insulated type inverter to convert DC power generated by the solar battery into AC power and outputs the AC power to a commercial power system, comprising:
    differential current detection means for detecting a differential current between output lines of the solar battery;
    AC leakage current removing means for removing an AC leakage current component due to a capacitance to ground of the solar battery from the differential current; and
    determination means for determining whether a ground fault state has occurred by comparing a current value output from said AC leakage current removing means with a predetermined threshold value.

2. The apparatus according to claim 1, wherein said AC leakage current removing means removes a frequency component twice a frequency of the commercial power system from the differential current.

3. The apparatus according to claim 1, wherein said AC leakage current removing means calculates a prediction value of an AC leakage current from a voltage variation amount of the output line of the solar battery and the capacitance to ground of the solar battery and subtracts the prediction value from a value of the differential current.

4. The apparatus according to claim 1, wherein said AC leakage current removing means calculates a prediction value of an AC leakage current from a voltage variation amount of a booster section of the non-insulated type inverter and the capacitance to ground of the solar battery and subtracts the prediction value from a value of the differential current.

5. The apparatus according to claim 1, wherein said AC leakage current removing means calculates a prediction value of an AC leakage current from an output power amount of the non-insulated type inverter and the capacitance to ground of the solar battery and subtracts the prediction value from a value of the differential current.

6. The apparatus according to claim 1, wherein said AC leakage current removing means includes filter means for removing a PWM component of the non-insulated type inverter from the differential current.

7. A solar power generation system comprising:
    a ground fault detection apparatus for detecting a ground fault of a solar battery in a solar power generation system which causes a non-insulated type inverter to convert DC power generated by the solar battery into AC power and outputs the AC power to a commercial power system, including,
        differential current detection means for detecting a differential current between output lines of the solar battery,
        AC leakage current removing means for removing an AC leakage current component due to a capacitance to ground of the solar battery from the differential current, and
        determination means for determining whether a ground fault state has occurred by comparing a current value output from said AC leakage current removing means with a predetermined threshold value; and
    control means for controlling operation of said non-insulated type inverter and a state of a system interconnection switch in accordance with a determination result from said ground fault detection apparatus.

8. A ground fault detection method of detecting a ground fault of a solar battery in a solar power generation system which causes a non-insulated type inverter to convert DC power generated by the solar battery into AC power and outputs the AC power to a commercial power system, comprising the steps of:
    detecting a differential current between output lines of the solar battery;
    removing an AC leakage current component due to a capacitance to ground of the solar battery from the differential current; and
    determining whether a ground fault state has occurred by comparing a current value after removal of the AC leakage current component with a predetermined threshold value.

* * * * *

UNITED STATES PATENT AND TRADEMARK OFFICE
CERTIFICATE OF CORRECTION

PATENT NO. : 6,930,868 B2
APPLICATION NO. : 10/055988
DATED : August 16, 2005
INVENTOR(S) : Kondo et al.

It is certified that error appears in the above-identified patent and that said Letters Patent is hereby corrected as shown below:

DRAWINGS:
Sheet 6, Fig. 5, "MEARNS" should read -- MEANS --.

COLUMN 10:
Line 52, "realize" should read -- realizes --; and
Line 61, "are" should read -- is --.

COLUMN 11:
Line 1, "are" should read -- is --.

Signed and Sealed this

Nineteenth Day of September, 2006

JON W. DUDAS
*Director of the United States Patent and Trademark Office*